April 13, 1926.
M. H. ALVORD
1,580,989
TOWING DEVICE
Filed April 9, 1924
2 Sheets-Sheet 1
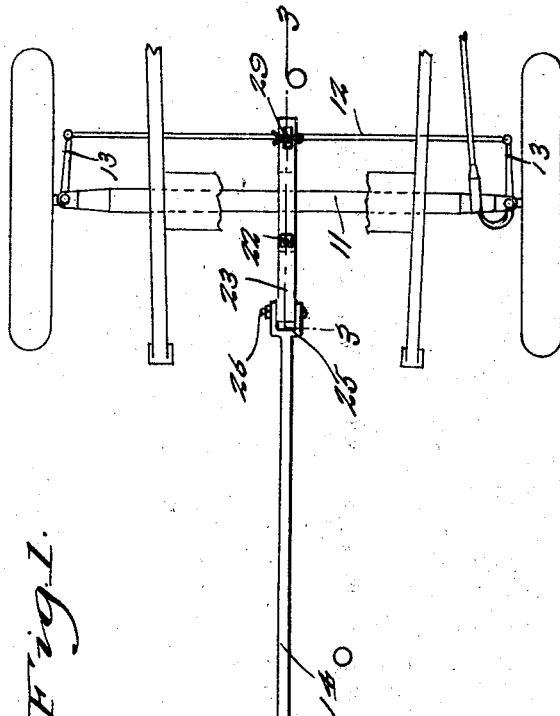
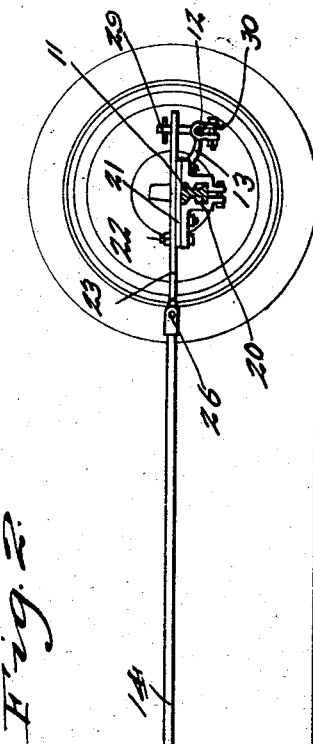
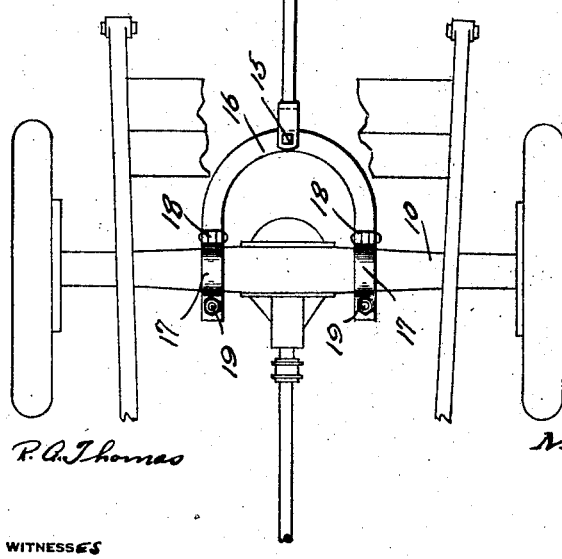

April 13, 1926.
M. H. ALVORD
1,580,989
TOWING DEVICE
Filed April 9, 1924
2 Sheets-Sheet 2
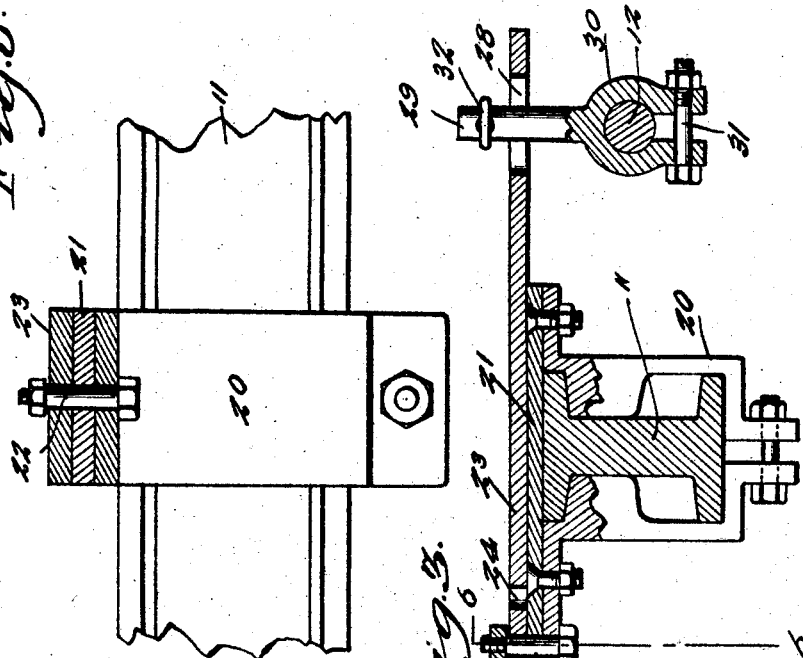
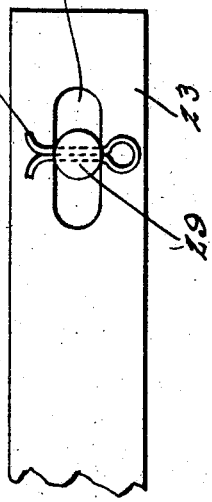
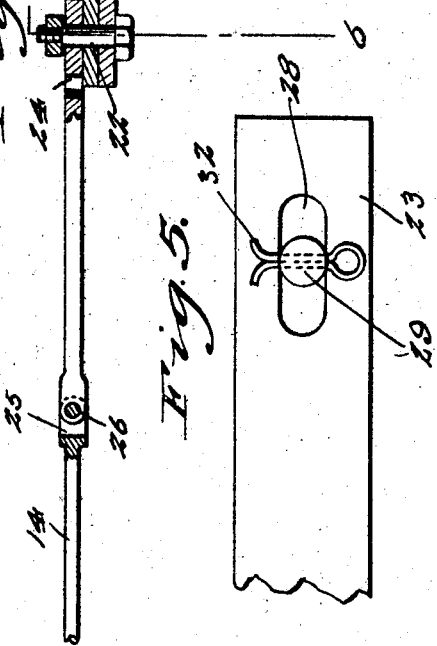
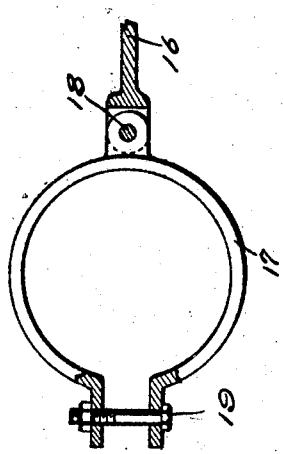
M. H. Alvord INVENTOR Patented Apr. 13, 1926.

1,580,989

UNITED STATES PATENT OFFICE.

MELZAR H. ALVORD, OF BOISE, IDAHO.

TOWING DEVICE.

Application filed April 9, 1924. Serial No. 705,370.

*To all whom it may concern:*

Be it known that I, MELZAR H. ALVORD, a citizen of the United States, residing at Boise, in the county of Ada and State of Idaho, have invented new and useful Improvements in Towing Devices, of which the following is a specification.

This invention relates to towing devices and has for an object the provision of means for connecting a towing and towed vehicle whereby the latter may be towed without requiring a driver, means being provided for causing the towed vehicle to follow the direction of travel of the towing vehicle.

Another object of the invention is the provision of a device of this character which may be readily attached and removed from both vehicles and which when in use will distribute the strain to the parts of the connected vehicles best able to withstand said strain.

With the above and other objects in view, the invention further includes the following novel features and details of construction, to be hereinafter more fully described, illustrated in the accompanying drawings and pointed out in the appended claim.

In the drawings:—

Figure 1 is a plan view showing a fragmentary portion of the chassis of a towing and towed automobile connected by the device constituting the present invention.

Figure 2 is a central longitudinal section with the invention shown in elevation.

Figure 3 is an enlarged detail section on the line 3—3 of Figure 1.

Figure 4 is a detail elevation partly in section showing the means of connecting the device to the towing automobile.

Figure 5 is a fragmentary plan view of one end of the device.

Figure 6 is a section on the line 6—6 of Figure 3.

Referring to the drawings in detail wherein like characters of reference denote corresponding parts, the reference character 10 indicates the rear axle housing of a towing automobile and 11 the front axle of an automobile being towed, while 12 indicates the rod which connects the arms 13 of the steering knuckles of the last mentioned automobile, whereby the said knuckles are simultaneously operated.

The towing device comprises a rod 14, one end of which is pivotally secured as at 15 to a yoke 16. The opposite ends of this yoke are clamped to the rear axle housing 10 of the towing automobile and for this purpose there is provided substantially semi-circular clamping plates 17 which are pivotally secured to the yoke 16 as shown at 18 and which are detachably and adjustably connected as shown at 19.

Detachably secured to the front axle 11 of the towed automobile is a substantially U-shaped member 20, the ends of which are connected by a plate 21, while pivotally secured to this plate as shown at 22 is a horizontally movable lever 23. The lever 23 is provided with spaced openings 24 for the passage of the pivot bolt 22 so that the said lever 23 may be adjustable upon the plate 21.

One end of the rod 14 is bifurcated as shown at 25 and pivotally secured within this bifurcated end upon a pivot pin 26 is one end of the lever 23. The opposite end of this lever is provided with a slot 28 for the passage of a pivot pin 29, the said pin extending from clamping arms 30 which receive between them the rod 12. The arms 30 are adjustably connected by a bolt 31, while a cotter or other pin 32 may extend through the upper end of the pivot pin 29.

It will be apparent from the foregoing description and accompanying drawings that the invention provides a device which may be readily secured to or removed from both the towing and towed vehicles and when in use will act to control the steering wheels of the towed vehicle so that the latter will properly follow the towing vehicle and a driver for the towed vehicle will not be necessary.

The invention is susceptible of various changes in its form, proportions and minor details of construction and the right is herein reserved to make such changes as properly fall within the scope of the appended claim.

Having described the invention what is claimed is:—

In an automobile towing device, a rod, means to secure one end of the rod for attachment to a towing vehicle, a pair of opposed substantially L-shaped members adapted to be placed upon opposite sides of the front axle of an automobile to be towed, means connecting the lower ends of said members beneath the axle, a plate extending across the top of the axle and connecting said members, a bar pivotally mounted upon the plate and having a slot in one end, means pivotally connecting the other end of the bar to the rod and a pin detachably secured upon the steering arm connecting rod and extending through the slot of the pivotally mounted arm.

In testimony whereof I affix my signature.

MELZAR H. ALVORD.